Nov. 2, 1948.  R. D. McCOY  2,452,586
PHASE SHIFT CIRCUITS
Filed March 23, 1944
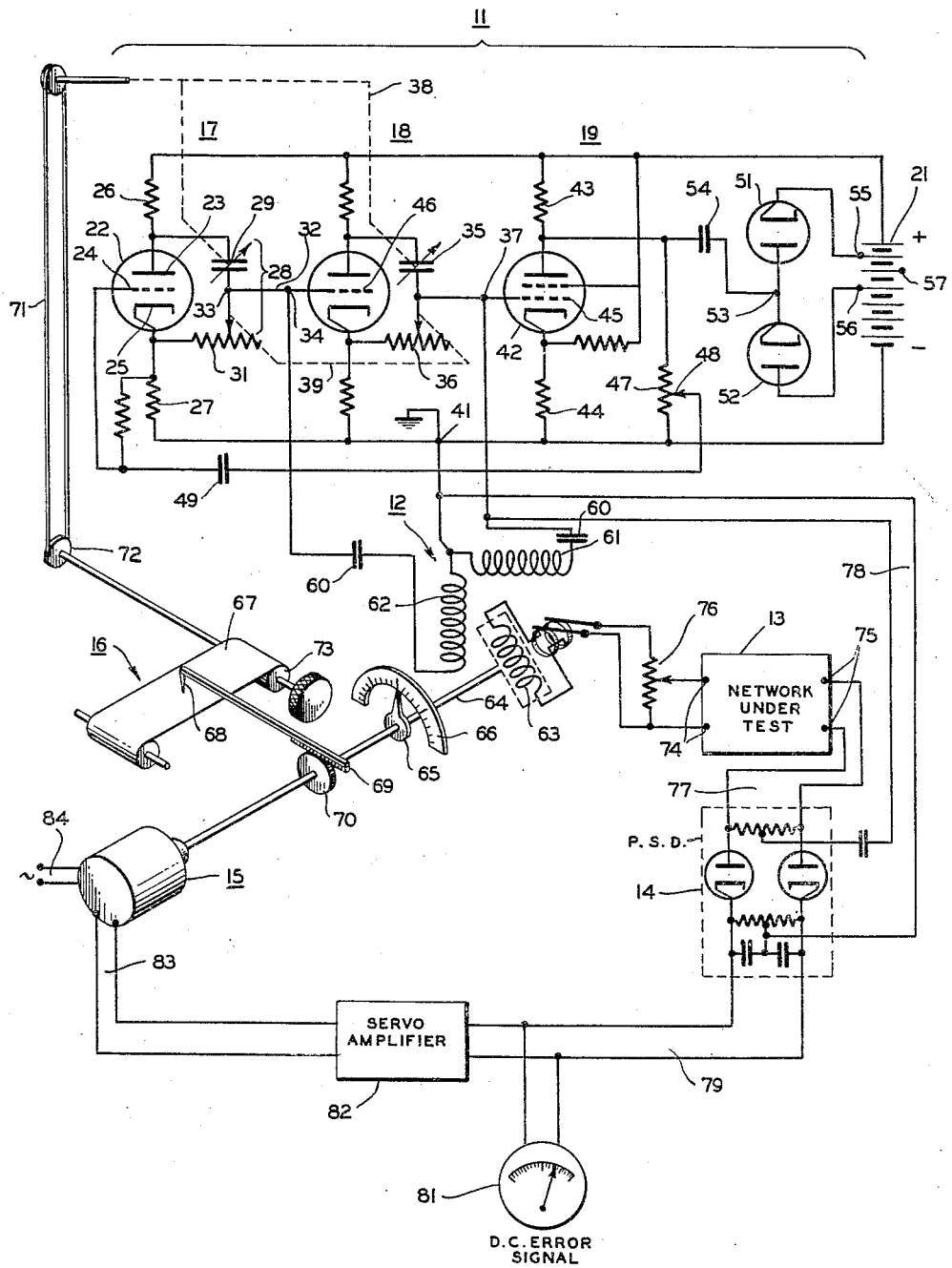
INVENTOR
RAWLEY D. McCOY
BY
Paul B. Hunter
ATTORNEY Patented Nov. 2, 1948

2,452,586

UNITED STATES PATENT OFFICE 2,452,586

PHASE SHIFT CIRCUITS

Rawley D. McCoy, Bronxville, N. Y., assignor to The Sperry Corporation, a corporation of Delaware Application March 23, 1944, Serial No. 527,769

8 Claims. (Cl. 250—36)

My invention relates to electric circuits, particularly electronic circuits.

Among the objects of my invention are the provision of an improved phase-shifting circuit employing an electric discharge device such as a vacuum tube, the provision of an improved resistance-capacity coupled oscillator, and the provision of an improved phase-shift testing apparatus.

A further object of the invention is to provide arrangements for producing and testing phase shifts as great as or exceeding 360 degrees.

A further object is to provide arrangements for producing continuous tests of phase shifts of apparatus under varying conditions and for making measurements of phase shifts which may be as great as a plurality of complete 360-degree phase rotations.

Still another object of the invention is to provide an automatic indicating or recording phase-shift-reading apparatus of the null or balanced type.

Another object of the invention is to provide an improved oscillator operable over a wide range of frequencies, and readily adjustable in frequency.

Still another object of the invention is to provide a resistance-capacity oscillator of good wave-form.

Other and further objects and advantages of the invention will become apparent as the description proceeds.

In carrying out my invention in its preferred form I provide a vacuum tube with resistance in the anode and cathode leads, and with resistance and capacity connected in series across the anode and cathode, one of the series-connected elements being adjustable. A phase shift is thereby obtained between the voltage input to the grid of the vacuum tube and the voltage at a junction terminal of the series-connected resistor and capacitor, the phase shift being variable by varying the magnitude of one of the series-connected elements.

For forming a resistance-capacity coupled oscillator a pair of resistance-capacity phase-shifting stages are connected in cascade, and an inversion circuit is coupled between the output of the second stage and the input to the first stage whereby regeneration takes place at the frequency for which 90 degrees of phase shift is produced in each stage. For producing a two-phase output, connections are taken from the common ground connection as the neutral, and from the output of the two phase shifting stages.

A further object of the invention is to provide an improved two-phase alternating current generator of the electric discharge device type.

Since the two-phase oscillator is operable over a wide range of frequencies it may be employed for testing phase shift characteristics over a wide frequency band. An automatic phase-shift tester may be produced by energizing a two-phase self-synchronous generator unit from the two-phase oscillator, supplying voltage from the rotor of the self-synchronous unit to a network under test, comparing the phase relationship of the voltage output with one of the input voltages of the self-synchronous unit, and operating a servo motor to rotate the rotor of the self-synchronous unit in response to deviation from a 90-degree phase relationship between the network output and the self-synchronous unit whereby the angular position of the rotor serves as an indication of the phase shift in the network under test. For producing a characteristic curve of phase shift in terms of frequency, the oscillator is adjusted to vary the frequency over a desired range.

A better understanding of the invention will be afforded by the following detailed description considered in conjunction with the accompanying drawings and those features which are believed to be novel and patentable will be pointed out in the claims appended hereto.

The single figure of the drawing is a circuit diagram of one embodiment of my invention.

The apparatus illustrated comprises a two-phase oscillator 11, a self-synchronous unit 12 energized by the two-phase oscillator and adapted to supply a voltage to a network 13 to be tested, a phase-sensitive detector 14 and a servo mechanism 15 responsive to the phase-sensitive detector 14 for moving the self-synchronous unit 12 to the position in which the phase-sensitive detector 14 is balanced. For producing graphic records of phase shift in the network 13 a curve-drawing device 16 may be connected to the servo motor 15. The combination of the oscillator 11 with servo apparatus 12, 14, 15, 16 for testing a network 13 is described and claimed in divisional application Serial No. 579,592 filed February 24, 1945.

The oscillator 11 comprises a pair of phase-shifting stages 17 and 18 and an inversion stage 19 energized by a common source of plate voltage 21. The stages 17 and 18 may comprise triode vacuum tubes and the inversion stage 19 may also comprise a triode vacuum tube, if desired, since it is required to supply only the losses in the stages 17 and 18. However, the invention is not limited to the use of triode vacuum tubes and for the sake of illustration, the stage 19 is represented as comprising a tetrode vacuum tube.

The stage 17 comprises a tube 22 having an anode 23, a control electrode or grid 24, and a cathode 25, with an anode resistor 26 in series with the lead to the positive terminal of a source 21, a cathode resistor 27 in series with the lead to the negative terminal of the voltage supply 21, and a phase-shifting circuit 28 connected between the anode 23 and the cathode 25. The phase-shifting circuit 28 comprises a pair of electric circuit elements 29 and 31, connected in series, the circuit elements being different types of impedance; for example, as illustrated the element 29 is a capacitor, and the element 31 is a resistor. One of the series connected circuit elements is made variable for the sake of varying the phase shift as will become apparent hereinafter.

A conductor 32 is brought out from a junction terminal 33 of the phase shifter elements 29 and 31 and an oscillator output terminal 34 may be connected to the conductor 32.

The phase shifter stage 18 of the oscillator 11 comprises elements similar to those of the phase shifter 17 including, for example, a condenser 35 and a resistor 36, and an output terminal 37. In order to produce a substantially exact quadrature relationship between the voltages at the output terminals 34 and 37, when the apparatus 11 is in oscillation, a substantially constant impedance relationship is maintained between elements 29 and 31 and the elements 35, 36. Preferably the elements 29, 31 are alike, and the elements 35, 36 are alike. In case the capacities are made variable, a mechanical connection 38 is preferably provided for ganging the condensers 29 and 35, and in case the resistors 31 and 36 are made variable a similar mechanical connecton 39 is preferably provided for causing like variations in the resistances of the elements 31 and 36. A ground connection 41 serves as a neutral terminal of the two-phase oscillator 11.

The inversion circuit 19, as shown, comprises a vacuum tube 42 having an anode load resistor 43, a stabilizing cathode resistor 44, and conventional electrodes including an input control electrode or grid 45. The grid 45 is coupled to the output terminal 37 of the phase shifter stage 18, and the phase shifter stage 18 has a control electrode or grid 46 coupled to the output terminal 34 of the phase shifter stage 17. The output of the inversion stage 19 is in turn coupled back to the control electrode or grid 24 of the phase shifter stage 17. For the sake of providing adjustment of the amplitude of oscillation, a potentiometer 47 may be provided consisting of a resistor connected between the anode of the tube 42 and the grounded negative terminal of the source 21 with a tap 48 adjustable in position connected to the first stage grid 24. For use at extremely low frequencies direct connections are preferably employed to the grids, however, when it is desired to produce frequencies as high as the lower range of the audio frequency band such as 10 cycles, for example, and particularly at higher frequencies it is desirable to make one of the connections nonconductive, and a coupling condenser 49 is then preferably interposed in the connection between the potentiometer tap 48 and the first stage input grid 24.

In order to guard against having the amplitude of oscillation build up to such an extent as to impair the wave-form, I prefer to provide a limiter for the oscillator 11. Such a limiter may take the form, for example, of a pair of diodes 51 and 52, connected in series with unlike terminals connected together and a junction terminal 53 coupled to a suitable oscillating point. The terminal 53 may, for example, be coupled to the anode of the inversion stage 19 through a coupling condenser 54. The diodes 51 and 52 are connected across two points, the potential difference between which is maintained equal to the desired maximum swing of the controlled point of the oscillator 11, and the absolute potential of the points to which the diodes 51 and 52 are connected is also fixed with respect to a fixed-potential point of the oscillator such as the ground connection. For example, the diodes 51, 52 may be connected to a pair of battery terminals 55 and 56, the voltage between which equals the desired maximum swing of the anode of the inversion stage 43. With respect to the battery terminals 55 and 56, there is a mid-terminal 57 which is grounded or maintained at a fixed potential with respect to ground. When a coupling condenser 54 is employed instead of the direct connection between the terminal 53 and the inversion stage 43, it is immaterial what the absolute potential of the points 55 and 56 may be so long as it is fixed, since the requisite difference between the average potential of the anode of the inversion circuit 43 and the average potential terminal 57 of the terminals 55 and 56 is allowed to build up on the condenser 54. The terminals 55, 56 and 57, may, therefore be points in the tube power supply 21.

The self-synchronous unit 12 comprises a two-phase stator having a pair of field windings 61 and 62 mounted in space quadrature, and a rotatably mounted armature or rotor 63, thus forming what may be called a rotary transformer. It may, e. g., be a two-phase unit of the "Selsyn" type, or it may be a unit of the "Telegon" type having a rotatable Z-shaped core and stationary windings.

The rotor 63 may be provided with a shaft 64 carrying a pointer 65 cooperating with a fragmentarily represented scale 66 calibrated in phase shift angles.

Although not shown in the drawing for the sake of simplicity, means should be provided for preventing the self-synchronism unit 12 from loading the stages 17 and 18. For example, cathode follower stages may be interposed between the terminals 34 and 37 and the windings 61 and 62, respectively. Blocking condensers 60 are provided to keep direct current out of the windings 61 and 62.

The recorder 16 comprises a movable chart 67 and a movable pen 68. The pen 68 is mechanically connected to the self-synchronous device rotor 63 in any suitable manner as by means of a rack-carrying linkage 69 engaging a pinion 70 on the shaft 64. If it is desired to produce a curve representing variation of phase shift angles with frequency, a linkage represented by a line 71 is provided, interconnecting the chart 67 and the frequency-controlling adjustment represented by the condenser gang control 38. The connection 71 may, for example, take the form of a chain drive between a sprocket 72 secured to a chart-carrying drum 73 and a similar sprocket (not shown) connected to the condenser control arm 38.

The recorder 16 is arranged for rotation of the drum 73 and hence movement of chart 67 in precisely controlled relation with frequency variation of the two-phase output of oscillator 11. The oscillator 11 is of a type especially suited to cooperate with the recorder drum 73, since the output frequency of the oscillator is substantially instantaneously responsive to the variation of the ganged reactance elements 29 and 35. The very wide frequency range of oscillator 11 also adapts it particularly for supplying the two-phase electric signal for application to the unit 12.

With the above features, the phase-shift tester and recorder is suitable for use with phase-shift vs. frequency chart forms based on predetermined relations between oscillator output frequency and the position of the recorder drum 73.

The network 13 is represented as being a four-terminal network having two input terminals 74 and two output terminals 75. If desired, a potentiometer 76 may be interposed between the rotor winding 63 and the input terminal 74.

The phase sensitive device 14 may be a phase-responsive demodulator of conventional type having a pair of input leads 77 connected to the network output terminals 75, a pair of reference voltage input leads 78 connected across a suitable source of reference voltage such as one of the phases of the oscillator 11 represented by the terminals 37 and 41, and a pair of output leads 79 to which an indicating device 81 may be connected for indicating the presence of a direct-current error-signal in case the phase relationship between the voltages at the terminals 75 and the reference voltage leads 78 departs from quadrature.

The phase-sensitive demodulator 14 need not be described in detail as it does not constitute a part of my invention. An example of such devices is described in the copending application of Gifford E. White, Serial No. 478,807, filed March 11, 1943, and another example is illustrated in Fig. 6 of Patent No. 2,042,831 to Crosby.

The scale 66 may be so calibrated that if there is no phase shift in the network 13 a zero indication will be produced on the scale 66 by the pointer 65 when the rotor 63 is in such a position as to give zero output at the indicator 81. Readings may then be made by adjusting the angular position of the rotor 63 manually to give a zero indication in the instrument 81. In order to produce phase-frequency curves rapidly, however, it is preferable to provide automatic adjustment of the angular position of the rotor shaft 63 and the servo motor 15 is therefore provided which is responsive to polarity of direct current input and preferably a suitable servo amplifier 82 is interposed between the output leads 79 of the phase-sensitive demodulator 14 and a pair of control leads 83 of the servo motor 15. It will be understood that such a servo motor is provided with a suitable source of power input through leads 84. The servo-motor 15 may take the form of a direct-current motor with an armature fed through the leads 84 and a field winding fed through the leads 83, or if desired, a more elaborate servo system may be employed such as disclosed in the application of G. DeWestfeld Serial No. 464,297 filed November 2, 1942, now Patent Number 2,411,871.

Since the phase shifting elements 29 and 31 of the phase shifters 17 and 18 are low-loss devices, low gain amplifier stages may be used which have inherent stability.

The phase shift at any frequency, assuming the resistors 31 and 36, and the condensers 29 and 35 do not load the phase inverters, will be $\theta = 2 \tan^{-1}(2\pi FRC)$ where $\theta$ is the phase shift in radians, F is the frequency in cycles per second, R is the resistance of the elements 31, 36 in ohms, and C is the capacity of the elements 29, 35 in farads. When $2\pi FRC$ equals one, the phase shift of each phase shifter will be 90 degrees.

With the two phase shifters 17 and 18 placed in cascade, as shown, there will be a phase shift of 180 degrees from the grid 24 to the output terminal 37 when the frequency is $$F = \frac{1}{2\pi RC}$$

So long as the resistances of the units 31 and 36 are maintained equal and the capacities of the condensers 29, 35 are maintained equal, the voltages from the terminals 32 and 37 to the ground or neutral terminal 41 will be 90 degrees out of phase so that a two-phase alternating-current source is formed. It will be understood that the gain of the tube 42 is preferably only sufficient to cause oscillation to start. Since no resonant circuits are employed the frequency range throughout which the oscillator 11 may be varied is limited only by the range of variability of the variable elements 29, 31, 35 and 36. As the remainder of the apparatus employs only inductive voltage transfer elements without any resonant circuit elements, the apparatus as a whole may be employed for testing phase shift of networks over an exceedingly wide range of frequencies. If desired, the linkage 69 between the shaft 64 and the recording pen 68 may be such as to indicate the number of revolutions of the shaft 64 and a record may thereby be produced showing complete rotations in phase of the phase shift in the network 13 as the frequency input thereto is varied over a range of frequencies.

It will be understood that the phase relationship between the voltage appearing in the rotor winding 63 of the self-synchronous device 12 and either one of the stator windings 61 and 62 depends upon the angular position of the rotor 63. It will be understood also that the phase-sensitive demodulator 14 produces zero output when the input voltages are in quadrature. Accordingly if there is any deviation from the quadrature relationship between the input voltages through the connections 77 and 78, a voltage will appear at the control leads 83 of the servo motor 15 causing it to rotate in one direction or another until the rotor 63 has been brought to the angular position for which the output of the phase sensitive demodulator 14 is zero.

Accordingly, the angular position of the pointer 65 and the position of the pen 68 on the chart 67 are indicative at all times of the phase shift in the network 13.

I have herein shown and particularly described certain embodiments of my invention and certain methods of operation embraced therein for the purpose of explaining its principle of operation and showing its application, but it will be obvious to those skilled in the art that many modifications and variations are possible, and I aim, therefore, to cover all such modifications and variations as fall within the scope of my invention as defined in the appended claims.

What is claimed is:

1. An oscillator, comprising first and second amplifier type phase-shift circuits connected in cascade and a phase inverter circuit coupled back from the second phase shift circuit to the first, each of said amplifier-type phase shift circuits comprising an electron discharge device and a phase shift circuit connected thereto and arranged to produce a phase shift varying through 90° according to frequency.

2. Apparatus as in claim 1 with a voltage limiter connected to an oscillating point in the voltage circuit and arranged to limit the amplitude of alternating signals in said first and second phase shift circuits and said phase inverter circuit.

3. An oscillator, comprising in combination, an electric discharge device having an anode, cathode, and a control electrode, a power supply, resistors connected in series with said power supply to said anode and cathode, respectively, a resistor and a substantially non-resistive impedance element connected in series across said electric discharge device, a second electric discharge device with elements corresponding to those of the first, a second pair of respectively resistive and substantially non-resistive elements connected in series across said second electric discharge device, and a phase inverter, the first pair of series-connected elements having a junction terminal coupled to the control electrode of the second electric discharge device, and the second pair of series-connected elements having a junction terminal coupled through said phase inverter to the control electrode of the first electric discharge device.

4. A variable-frequency two-phase signal generator for producing two output voltages of equal amplitude, quadrature phase relationship, and variable frequency under substantially instantaneous control of a frequency control device, comprising a first electron discharge device having a first adjustable output phase-shifting circuit, a second electron discharge device having a second adjustable output phase-shifting circuit, said second electron discharge device being responsive to the phase-shifted output of said first circuit for producing an amplified version thereof, phase-inverter means responsive to the output of said second circuit for producing a phase-inverted version of the output of said second circuit, means for applying said phase-inverted version to said first electron discharge device for providing a feedback signal thereto from said second electron discharge device for sustaining oscillations, and means for simultaneously and equally varying the phase-shift characteristics of said first and second circuits whereby the output frequency of said generator is varied without relative phase variation of said first and second circuits.

5. Apparatus for receiving an input voltage and producing an output voltage of phase variable through a phase angular range of substantially 180° extent relative to the input voltage according to the frequency thereof, comprising an electron discharge device having an anode and a cathode and a control electrode, a two-terminal anode voltage source, first impedance means connected between said cathode and a first terminal of said source and second impedance means connected between said anode and the other terminal of said source, and a resistor and a reactor connected in series between said anode and said cathode and having a junction therebetween, whereby alternating voltage between said control electrode and said cathode is reproduced as an output voltage between said junction and said first source terminal of phase dependent upon the input voltage frequency.

6. Apparatus as defined in claim 5, wherein said first impedance means and said second impedance means are characterized by substantially equal impedance values, whereby the amplitude of said output voltage is rendered substantially independent of the frequency of said input voltage.

7. Apparatus as defined in claim 5, wherein said first impedance means and said second impedance means comprise resistors characterized by substantially equal resistance values, whereby the amplitude of said output voltage is rendered substantially independent of the frequency of said input voltage, and the phase displacement between said input voltage and said output voltage varies between substantial cophasality and substantially opposite phase relation.

8. In combination, a pair of apparatuses such as set forth in claim 5 connected in cascade, and an inversion device connected between the output terminal of one of said apparatuses and the control electrode of the other.

RAWLEY D. McCOY.

REFERENCES CITED

The following references are of record in the file of this patent:

UNITED STATES PATENTS

| Number | Name | Date |
|---|---|---|
| 1,946,274 | Chereix | Feb. 6, 1934 |
| 1,972,535 | Page | Sept. 4, 1934 |
| 2,024,489 | Pol | Dec. 17, 1935 |
| 2,155,210 | Young | Apr. 18, 1939 |
| 2,207,511 | Geiger | July 9, 1940 |
| 2,236,985 | Bartelink | Apr. 1, 1941 |
| 2,254,734 | Falloon | Sept. 2, 1941 |
| 2,285,038 | Loughlin | June 2, 1942 |
| 2,340,429 | Rankin | Feb. 1, 1944 |
| 2,354,799 | Crosby | Aug. 1, 1944 |

FOREIGN PATENTS

| Number | Country | Date |
|---|---|---|
| 489,849 | Great Britain | Aug. 4, 1938 |
| 555,771 | Great Britain | Sept. 7, 1942 |